INVENTOR:
CHARLES L. ROUAULT,
BY C. W. Baker
HIS ATTORNEY.

United States Patent Office 3,403,394
Patented Sept. 24, 1968

3,403,394
DIVERSITY RADAR SYSTEM
Charles L. Rouault, Boxford, Mass., assignor to General
Electric Company, a corporation of New York
Filed July 19, 1966, Ser. No. 566,377
6 Claims. (Cl. 343—5)

ABSTRACT OF THE DISCLOSURE

This disclosure describes radar systems utilizing diversity of frequency and polarization for improved performance and improved reliability of performance in the presence of propagation anomalies in the atmosphere. Specifically described are radar antenna constructions enabling signal transmission and reception by a single antenna with diversity of both polarization and frequency, and means for additively combining and selectively processing signal returns to optimize the usable information output under different radar operating conditions.

---

This invention relates generally to radar systems and more specifically to radar systems utilizing diversity of at least one of such radar operating parameters as frequency and polarization.

In the microwave communications field the existence of propagation anomalies in the atmosphere, and their adverse effect on communications reliability and consistency of transmission over long distances, have long been recognized. Among the more pronounced of these phenomena are:

(1) Refraction deviations due to varying indices of refraction;

(2) Atmospheric fluctuations which cause discontinuities in the propagation path or excessively rapid fading;

(3) Interference with the direct ray by ground and ionosphere reflected rays;

(4) Signal distortion due to varying atmospheric effects such as storm, fog, wind, etc.

To maintain consistent and reliable transmission and reception links even in the presence of propagation anomalies such as the foregoing, communications system designers have evolved sophisticated techniques for minimizing the effects of atmospheric perturbations and other causes of signal loss or fade. Among the more widely and successfully used of these techniques is that of diversity, i.e., the use of two or more diverse channels of transmission which differ from each other in frequency, polarization, spatial orientation or other operating parameter. With simultaneous transmission over such parallelled channels, signal fluctuations in the individual channels become decorrelated or independent and there is higher probability that at any given moment at least one of the several channels will be affording usably high signal-to-noise ratio thus providing continuity of communication.

While the effects of propagation anomalies on the performance of radar systems also has long been recognized, the various diversity arrangements developed in communications work have in the past not found similar application over into the radar field. The more conventional approaches to improvement of radar range and detection capability have instead involved either increases in transmitter power level, improvements in receiver sensitivity, or the use of more sophisticated signal processing techniques capable of extracting a usable signal even with extremely poor signal-to-noise ratio, neglecting the propagation effects cited. One reason for this difference in approach is that the adverse effects of propagation anomalies on radar performance differ in kind and severity from the effects on communications links, and often can not be remedied in the same way. For example, reflection of signal by clouds and other atmospheric inhomogeneities back toward a communications transmitter may cause some reduction of strength or fidelity of the received signal but it normally does not preclude reception. In the case of radar, however, the received signal is itself a reflected signal from a relatively smaller and usually more remote target reflector, so it may be completely masked by reflected signal from clouds or other such intervening clutter thus effectively precluding detection of the target.

In accordance with the present invention, radar system performance may be significantly enhanced in these and other areas by incorporating diversity of at least one radar operating paarmeter into the system. Radar performance may thus afford substantial improvement in range and probability of detection, and improvement may also be realized in other important aspects of radar performance such as the ability to detect targets obscured by adverse weather or ECM environments and the capability to detect below-the-horizon targets, these results being accomplished with but little additional system complexity and correspondingly small additional cost. It is therefore a primary object of the invention to provide radar systems affording improved capabilities in range and in probability of detection through use of diversity of one or more radar operating parameters such as frequency and polarization. Another object of the invention is the provision of radar diversity capability which may be incorporated into radar systems at time of original manufacture with little additional system complexity or retrofitted into existing radar systems without basic reconstruction.

It is also an object of the invention to provide a diversity radar system wherein both frequency and polarization diversity are accomplished with but a single antenna which requires only minor modification from the conventional and which may take any of several forms suitable to the particular application. A further object of the invention is the provision of diversity radar systems incorporating means for gating at least certain of the diverse channels so as to provide a number of different diversity modes from which may be selected that mode which provides the most significant improvement in radar performance under existing operating conditions.

Briefly stated, in one presently preferred embodiment of the invention both frequency diversity and polarization diversity are provided using only a single antenna for both transmission and reception. The radar transmitter includes means affording frequency agility, i.e., means enabling transmission at two or more different frequencies spaced from each other sufficiently that propagation variations are decorrelated or independent, and is energized in a manner to produce a series of split pulses each of which includes a first part at one of these different frequencies and a succeeding part or parts at other such frequencies. The transmitter then transmits the entire pulse over a single antenna having bandwidth capabilities at least adequate to accommodate both of the pulse frequencies. In addition to this required bandwidth capability, the antenna must be capable of transmitting with one polarization and receiving signals having that polarization as well as signals polarized orthogonal thereto. Received signals then may be of four or more distinct types, each having one of the transmitted frequencies and either of the two received polarizations. These several returned signals are processed through a like number of receiver channels and then additively combined, preferably through both an adder and a "greatest-of" or peak selector. Since the nature and effects of propagation anomalies on radar operation often differ with different angles of elevation of the radar line of sight, as well as with differences in weather and other operating conditions, means desirably may be incorporated into the system for disabling one or more of the diversity channels under operating conditions or at elevation angles at which those particular channels afford no significant improvement in radar operation.

The invention will be further understood and its various objects, features and advantages more fully appreciated by reference to the appended claims and the following detailed description when read in conjunction with the accompanying drawings, wherein:

Figure 1:
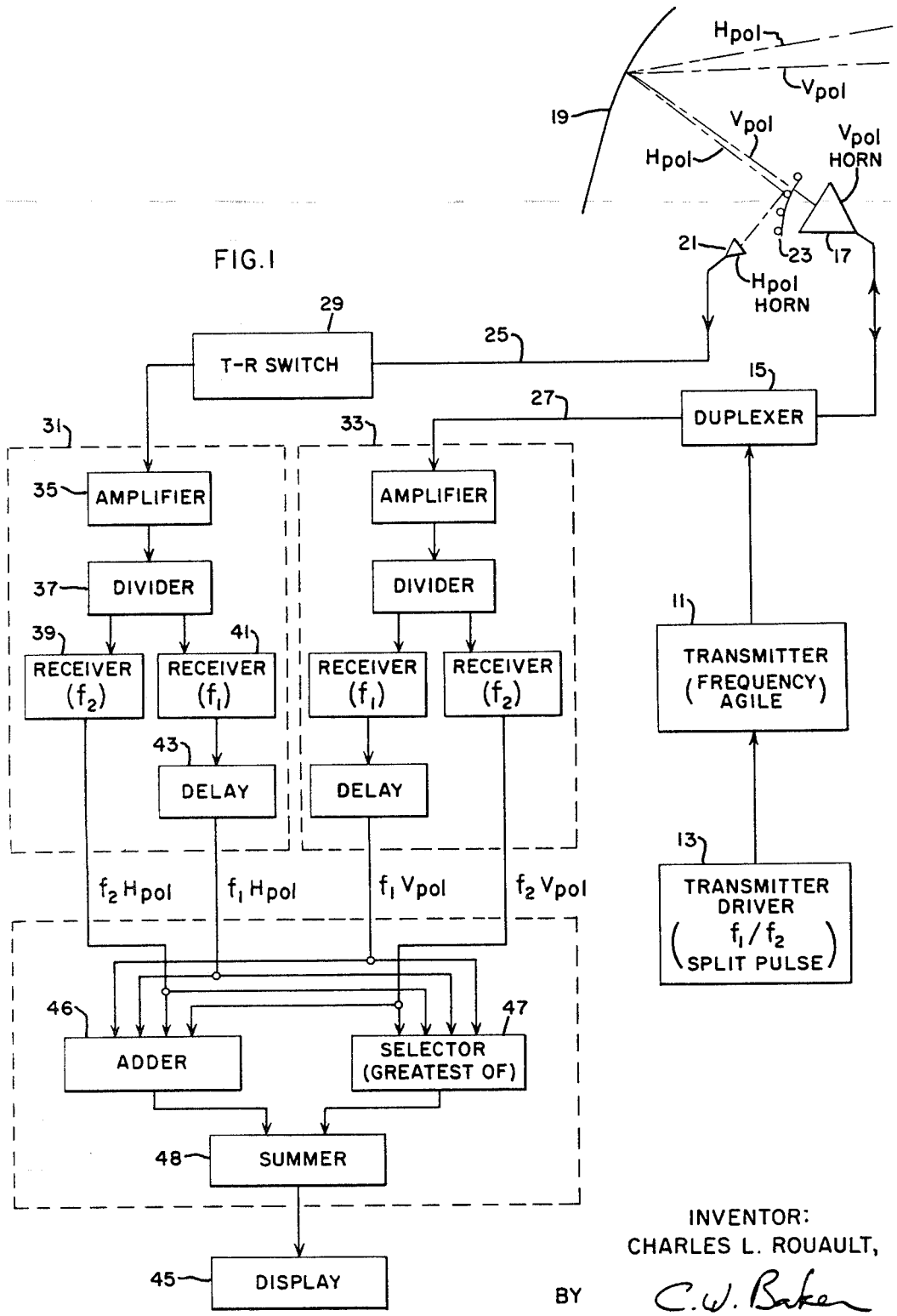
FIGURE 1 is a block diagram of a diversity radar system in accordance with the invention.

With continued reference to the drawings, wherein like reference numerals have been used throughout to designate like elements, the invention is illustrated as embodied in a diversity radar system utilizing diversity of frequency and of polarization. That is, the system transmits at two different frequencies differing sufficiently from each other that their propagation characteristics are effectively decorrelated or independent of each other, and it also receives at both these frequencies. The system may transmit with either horizontal or vertical polarization, vertical polarization being transmitted in the particular embodiment illustrated, and is capable of receiving both vertically polarized and horizontally polarized signals so as to provide the dual polarization capability specified.

In FIGURE 1 each of the basic subsystems of a diversity radar system in accordance with the invention is shown in block form with the blocks labeled as to function. The transmitting subsystem includes a frequency agile transmitter 11 of essentially conventional construction capable of transmitting at frequencies spaced apart sufficiently to provide the desired decorrelation or independence of signal propagation characteristics, and capable of switching between these different frequencies in a time which is negligible as compared with the total transmitted pulse length. Typically, frequency separation of about 4% has been found adequate to provide the desired decorrelation between propagation characteristics of signals at two different frequencies; wider separation of frequencies should of course provide equally good decorrelation but might involve difficulties in antenna or other component design to provide the necessary wider bandwidth capability and, of course, would require occupancy of a wider frequency band. Frequency separation substantially less than 4% also is possible and under some conditions of operation may afford equally good decorrelation of channels, but may not do so with the same uniformity of result. Variation of frequency separation from pulse to pulse on either a coded or random basis may also be advantageous under some conditions such as in the presence of jamming or other ECM.

Preferably, the transmitter is driven to generate and transmit a dual frequency pulse in which the two frequencies are transmitted within each pulse on a time-share basis, the first half of each transmitted pulse being at one frequency and the second half of the pulse at the other. In one representative embodiment, for example, the transmitter was driven to produce a split pulse in which the two frequencies were both at high S-band and had a frequency difference between them of about 4%. The switch time between frequencies was approximately 100 nanoseconds which was less than one percent of the total transmitted pulse length and thus was negligible as compared to pulse length. It will be noted that with this arrangement the total transmitted peak and average power represented by the composite pulse is approximately the same as in a conventional single frequency system.

The transmitter 11 in FIGURE 1 is driven to produce such a split pulse (at frequencies $f_1$ and $f_2$) by a driver chain 13 which is shown in greater detail in FIGURE 2 and which will be described later with specific reference to that figure. The transmitter connects through the usual duplexer 15 to an antenna comprising a feed horn 17 and reflector 19 which may be of conventional construction. As indicated by the designation $V_{pol}$, feed horn 17 is vertically polarized so that only a vertically polarized signal is transmitted, and a similarly polarized signal only is received through this horn. In the illustrated embodiment polarization diversity is accomplished, on receive, by provision of an additional horn 21 which is horizontally polarized as indicated by the designation $H_{pol}$, and which is positioned to receive radiation from a horizontally polarized mirror 23 disposed adjacent the focal point of the reflector 19. This horizontally polarized mirror is of horizontal wire grating or similar construction such that it passes vertically polarized radiation to and from the vertically polarized horn 17 and reflector 19 with relatively little attenuation but reflects horizontally polarized radiation to horn 21 with relatively little loss.

With this arrangement, vertically polarized radiation from the transmitting horn 17 passes unimpeded through the horizontally polarized mirror 23, as do the vertically polarized returns during reception. Any returns which have been shifted 90° in polarization, due either to target characteristics or to anomalies in the propagation path, are reflected by the horizontally polarized mirror into horn 21. Separate waveguide runs 25 and 27 connect these two antenna horns to their respective receiver channels, the connection of the vertically polarized waveguide 25 being through a transmit-receive switch 29 of conventional type. The receiver is a four channel one including paired channels 31 and 33 for each of the vertically polarized and horizontally polarized signal returns. Since the two paired channels are essentially the same, only one will be described.

Figure 3:
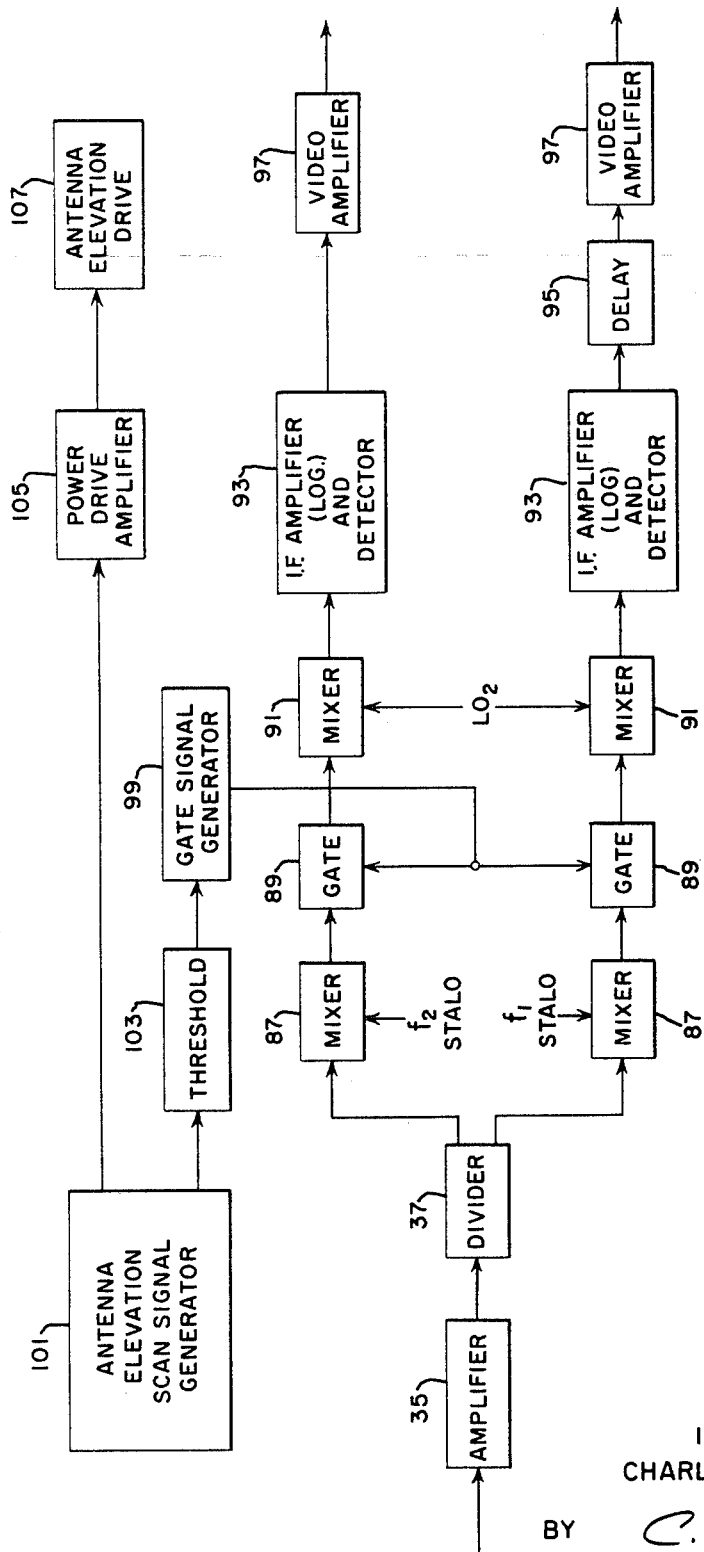
FIGURE 3 is a block diagram of one of the two pairs of receiver channels in the radar system of FIGURE 1.

Receiver 31 comprises an RF amplifier 35 providing its signal output through a divider 37 to the IF and video amplifier stages of two receiver or signal processing channels 39 and 41 which are illustrated in greater detail in FIGURE 3, and which in FIGURE 1 are designated "RCVR($f_1$)" and "RCVR($f_2$)," respectively. As the frequency designation on these signal processing channels suggests, each passes signals of but one of the two frequencies $f_1$ and $f_2$. The output of channel 39 accordingly contains any horizontally polarized signal return of the first half of the split pulse, at frequency $f_1$, and channel 41 has as its output signal any horizontally polarized return of the second half of the split pulse, at frequency $f_2$.

Receiver channels 39 and 41 are constructed to provide output signals at a common video frequency so as to permit direct combination of these signals. To enable such combination of signals it is necessary that the $f_1$ signal in channel 41 be delayed with respect to the $f_2$ signal, in order that the earlier transmitted half of the pulse, at frequency $f_1$, be precisely juxtaposed in time with respect to the later transmitted half, at $f_2$. For this purpose, channel 41 connects through a delay element 43 to the signal combiner 44, and this delay element is adjusted to provide a time delay just equal to the pulse length of the first half of the split pulse, i.e., equal to the length of the pulse $f_1$.

Receiver 33 for the vertically polarized signals is identical to that just described, and connects also into the combiner 44. This combiner may take any of several forms and as shown comprises an adder 46 which accepts the signal output from each of the receiver channels and adds them all together, either by simple addition as in a resistive adder network or by weighted addition in which extra weight is given to larger signals to thus nonlinearly suppress those inputs containing only noise and no target signal. Adders of both analog and digital form for accomplishing either linear or weighted addition are well-known in the art, of course, and require no further description. In parallel with this adder there is shown a "greatest-of" selector 47 which operates essentially as an "or" circuit and selects the one largest of the various signals appearing on the four receiver channel outputs.

The signals thus combined in adder 46 and selector 47 may be further combined in a summing circuit 48 which affords simple linear addition of its two signal inputs and transmits the signal thus combined to any suitable display 45. Signal combination in this fashion produces highest probability of target detection because peak selection as accomplished by selector 47 and weighted addition as accomplished by the adder 46 both are processes which nonlinearly enhance signal-to-noise ratio. Similarly, performance is enhanced by use of logarithmic amplifiers in the IF stages as indicated in FIGURE 3, since these also nonlinearly enhance the signal-to-noise ratio. Combination of signals after detection instead of at RF or IF also serves this same purpose, because under conditions of anomalous propagation there can be no assurance of coherence between received signals at either RF or IF.

Other possibilities for signal combination may offer advantages in certain applications. For example, it would be possible through cross correlation between two or more of the four channels to reduce the radar false alarm ratio or the effects of ECM spoofing, though such requirement for cross-correlation could result in some reduction in probability of detection. Other possibilities include the selection of one or the combination of two or some other combination less than all of the four receiver channel signals through either addition or "greatest-of" selection, with switching between these various possibilities being accomplished by the radar operator as necessary to optimize target detection capability under the particular operating conditions then existing.

Figure 2:
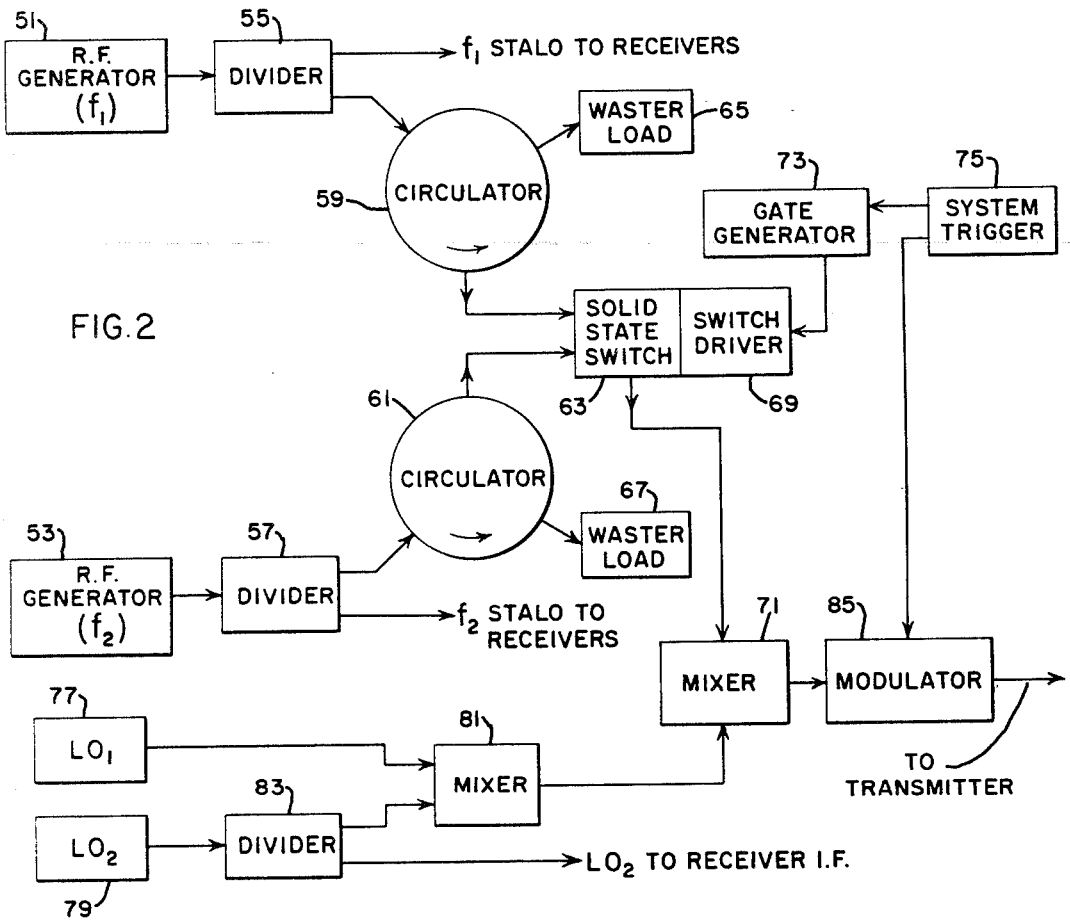
FIGURE 2 is a block diagram of a transmitter driver chain suitable for use in the radar system of FIGURE 1.

Referring next to FIGURE 2, the transmitter driver chain is shown in block diagram form and as illustrated comprises separate RF sources 51 and 53 for each of the frequencies $f_1$ and $f_2$. Alternatively, of course, only a single radio frequency signal source could be employed with a local oscillator and mixer then being utilized to generate the second required RF signal in conventional fashion. In either case, the frequencies $f_1$ and $f_2$ preferably are spaced by approximately 4% as previously explained. Each of the RF sources connects through a divider 55 or 57 one output of which provides a STALO input to the receiver channels (FIGURE 3) and the second output of which connects into one of a pair of three-port circulators 59 or 61. These circulators serve to prevent power from being reflected back from a solid state switch 63 to which their respective outputs are connected, and which connects one or the other of these signal sources to the transmitter as will be explained. Circulators 59 and 61 prevent the high VSWR that exists at each channel input to this switch, when that particular channel is in the "off" condition, from reflecting back toward the signal source. The reflected signal is instead dissipated in one of two waster loads 65 and 67 connected to the third port of each circulator.

The solid state switch 63 may be of any suitable type providing the required SPDT switching configuration, and is driven by a switch driver 69 so as to alternately connect the RF sources 51 and 53 to a mixer 71 in the transmitter driver chain. Switch driver 69 is controlled by a gate generator 73 which in turn is controlled by the system trigger 75. Gate generator 73 is operative to produce two control signals for the switch driver, a first control signal positioned in time at the mid-point of the transmitted pulse, i.e., at the mid-point of the "on" signal from system trigger 75 to the transmitter modulator, and a second signal at approximately the mid-point of the transmitter dead time.

The gate generator produces these signals in response to the transmitter "on" and "off" signals from system trigger 75, and transmits the signals produced to switch driver 69. When the first signal from gate generator 73 is applied to the switch driver, the solid state switch is actuated to connect the output signal from $f_1$ generator 51 to mixer 71 and to block the signal from $f_2$ generator 53. On arrival of the second signal from the gate generator, switch driver 69 causes switch 63 to disconnect the $f_1$ signal source 51 and to connect the $f_2$ signal source 53 to mixer 71. The timing is such that the first half of each transmitted pulse is at the $f_1$ frequency and at the mid-point of the pulse that frequency is switched off and the $f_2$ frequency switched on. At approximately the halfway point between termination of one transmitted pulse and commencement of the next, the $f_1$ frequency is switched on again and the $f_2$ frequency signal switched off to await the beginning of the next transmitted pulse, when the cycle repeats. Gate generator and switch driver circuitry operative to drive diode or similar solid state switch devices in this fashion is well-known and no further description of these components is necessary.

Using such available signal switching devices the switch time between frequencies may be approximately 100 nanoseconds or less, which is a negligible amount when compared with the total transmitted pulse length, which typically may run in the neighborhood of 10 microseconds. The total transmitted peak power and the average power represented by the composite pulse is, therefore, essentially the same as in a system not utilizing diversity.

The transmitter driver chain includes the mixer 71 previously described, one input to which comprises the $f_1$ and $f_2$ signals which are generated by RF sources 51 and 53 and connected, alternately, through switch 63. Mixer 71 combines the transmitted one of these two signals $f_1$ and $f_2$ with an LO signal provided by two local oscillators 77 and 79 having their signals added in a mixer 81. The output from one of these oscillators, $LO_2$, also is supplied through a divider 83 to the receiver channels (FIGURE 3) where it is used for down conversion to the second IF frequency.

The output of mixer 71 controls the transmitter through a modulator 85 which in turn is controlled by the system trigger 75 in conventional fashion. Transmission is at two frequencies, $f_1$ plus the combined frequencies of the two local oscillators and $f_2$ plus the combined LO frequencies, and as previously explained each of these frequencies is the frequency of transmission of one half of a split pulse. The system as shown uses only a single transmitter, but of course if desired a completely separate transmitter and driver chain for each of the two frequencies of transmission could be provided in which case maximum power levels could be made correspondingly higher.

Referring next to FIGURE 3, one of the two paired receiver channels is shown in more detail. As shown, this receiver subsystem comprises two receiver channels which may each be of conventional construction except as hereinafter noted. Each channel comprises a first mixer 87 in which the signal return is heterodyned against either the $f_1$ or $f_2$ STALO signal supplied by the transmitting subsystem of FIGURE 2. The signal thus is down-converted in mixer 87 to the first IF frequency, then is amplified, passed through a gate 89 the purpose and operation of which will be explained later, and then is again down-converted in a mixer 91 to which the $LO_2$ local oscillator signal from the transmitting subsystem of FIGURE 2 is supplied. The output signal from this second mixer is fed to a logarithmic amplifier 93 for amplification and detection. Each log amplifier provides a video signal output representing an analog of the received power so normalized as no longer to reflect any of the differences in polarization, frequency, or other operating parameters by which diversity of transmission and reception is introduced.

There remains, of course, a difference in time of reception of the $f_1$ and $f_2$ parts of the split pulse, and this difference also must be reconciled if all the signal returns are to be directly combined. For this purpose, the receiver channel in which the $f_1$ signal is processed incorporates a delay element 95 providing time delay equal to the length of the first or $f_1$ part of the transmitted pulse, so as to displace this $f_1$ pulse to be in time coincidence with the $f_2$ pulse. Since the exact value of delay required to accomplish this may vary slightly with operating conditions and is influenced by electrical path length differences involving cable lengths and dress, the delay element may desirably be made adjustable with at least enough range of adjustment to enable placing the $f_1$ pulse in precise time coincidence with the $f_2$ pulse under all operating conditions.

The $f_1$ pulse thus delayed, and the $f_2$ pulse undelayed, are connected to video amplifiers in their respective receiver channels, with the outputs of these amplifiers constituting the video signal input to a combiner circuit as shown at 44 in FIGURE 1 and described above with reference to that figure.

As previously indicated the adverse effects of propagation anomalies in the atmosphere vary widely with differences in weather and other operating conditions. Frequently recurrent, however, is the troublesome problem of masking of target returns by strong reflection of signals from intervening or surrounding clutter, such clutter returns being often of sufficient strength to saturate the receiver and thus prevent target detection. Alleviation of this problem is possible by operation in one of the diversity modes of this invention, in accordance with which polarization diversity is accomplished by transmitting signals of one linear polarization only—i.e., with vertical polarization in the embodiment as previously described— and receiving only signals of the orthogonally related polarization which in this case is horizontal.

Signal reflection from the clutter is largely of the transmitted polarization and so will effectively be discarded and not processed through the receiver when operating in this mode. While signal reflected by the target will in part also be of the transmitted polarization and this part of the target return will be discarded along with the clutter returns, the target return will in most cases include an orthogonally polarized signal of strength adequate for detection in the receiver. In practice it has been found that by thus transmitting signals of one polarization and receiving only the orthogonally polarized signal it becomes possible to detect targets otherwise not detectable because completely masked by clutter.

Signal processing in this fashion can be accomplished in the receiver circuit of FIGURE 3 by operation of the gate 89 in the appropriate ones of the receiver channels to pass only those signal returns which are polarized orthogonally to the transmitted signal. Such selection may either be performed by the operator or be performed automatically. In the illustrated embodiment the gates 89 are automatically controlled by means responsive to the angle of elevation of the radar line of sight, this particular parameter being made the controlling one because clutter generally is more severe and more likely to require corrective action at lower angles of elevation. As shown, therefore, gates 89 are controlled by a gate signal generator 99 which in turn is controlled in response to the antenna elevation drive signal produced by signal generator 101 and transmitted to the gate signal generator through a thresholding device 103.

The antenna elevation drive signal generator and the drive itself may take any of many different forms dedepending upon whether the antenna is scanned in elevation by rotating the reflector or includes an organ pipe or other scanning feed, or is of array antenna type in which scanning is accomplished electronically. In any case, however, the vertical scan signal will either be in the form of, or may be converted to the form of an electrical signal of magnitude proportional to elevation angle. Such signal is supplied to a thresholding circuit 103 which allows signal transmission only while the signal level remains below some predetermined threshold level which in this case is the level representing the particular elevation scan angle below which the vertically polarized signal returns are predominantly clutter and accordingly contribute little to radar performance. Below this theshold value of elevation angle the threshold circuit 103 passes the elevation scan signal to the gate signal generator 99 which in turn produces a control signal operative on gates 89 to block the vertically polarized signal returns through the two receiver channels through which they normally are processed. As the radar line of sight rises above the selected threshold value of elevation angle, threshold 103 cuts off the elevation scan signal to gate signal generator 99 and this in turn unblocks the gates 89, thus restoring and maintaining full polarization diversity until the radar line of sight again drops below the selected cut-off angle.

In the absence of severe clutter at low elevation it may be beneficial to continue operation with all receive channels, including both polarizations, even at low elevations. For this purpose manually operated means may be provided for disabling the gates 89 so as to enable diversity reception modes which would otherwise not be permitted by the gates under these conditions. Similarly, the gates 89 in the receiver channels which process the signal returns polarized orthogonally to the transmitted signals, i.e., horizontally polarized returns in the embodiment illustrated, may be controlled manually as necessary to optimize radar performance under the existing operating conditions. As will be obvious to those skilled in the art, equivalent results also may be obtained by provision of separate or switched displays for signal returns of each of the two orthogonally related polarizations, thus enabling selection between them at the will of the operator.

Figure 4:
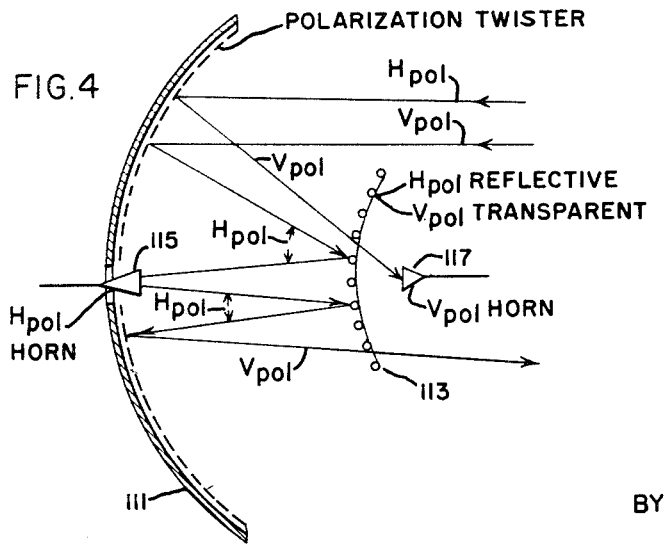
FIGURE 4 is a perspective and somewhat diagrammatic view of an alternative antenna structure providing dual polarization capability and suitable for use in the radar system of FIGURE 1.

With reference now to FIGURE 4, an alternative embodiment of the invention is shown in which a Cassegrain antenna is used, providing the desired polarization diversity in relatively simple fashion and with virtually no aperture blockage over that characteristic of the conventional Cassegrain antenna configuration. As shown, the antenna comprises the usual reflector 111 having on its reflective surface a "twistreflector" of known type which functions as a quaterwave plate operative to produce a 90° rotation of the plane of polarization. The subreflector is shown at 113 and consists of a horizontal grating of wires operative to pass vertically polarized waves with negligible attenuation and to reflect horizontally polarized waves with which it is illuminated by the horizontally polarized feed horn 115. Because this subreflector 113 is transparent to vertically polarized waves, it passes with little if any attenuation the radiation from feed horn 115 which has initially been reflected by the subreflector and subsequently again reflected by the "twistreflector," so that such radiation may be transmitted directly through the subreflector and the subreflector accordingly does not significantly reduce the antenna effective aperture. Similarly, because the subreflector is essentially transparent to vertically polarized waves, it passes target returns which are horizontally polarized when incident upon the "twistreflector" surface of the main dish and which are vertically polarized after reflection therefrom. Such returns, after reflection by the "twistreflector" and tansmission though the subreflector, are received in a vertically polarized horn 117, providing a horizontally polarized input to the receiver of FIGURE 3 essentially similar to that provided by the horizontally polarized horn 21 in the embodiment of FIGURE 1. It will be understood that with this antenna construction the capability to receive diversely polarized returns may be added with no reduction of antenna effective aperture except that attributable to the horn 117, and since this horn may be aligned directly with the main feed horn 115 in the conventional antenna arrangement the aperture reduction is negligible.

From the foregoing it will be apparent that polarization and frequency diversity in accordance with the invention may be incorporated into radar systems with little additional complexity in either the antenna structure or elsewhere in the system, and its substantial benefits may be achieved in terms of improved probability of detection and reliability of detection at low elevation angles. While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by letters patent of the United States is:

1. A diversity radar system comprising:
   a transmitter including means enabling transmission at a plurality of frequencies differing substantially from each other;
   means energizing said transmitter to produce a series of split pulses each including a first part at a first frequency and a second part at a second frequency differing substantially from the first;
   antenna means connected to said transmitter and adapted for transmission and reception of signals at said first and second frequencies and including means enabling reception of reflected signals of first and second linear polarizations orthogonally related to each other;
   a receiver including at least two pair of signal processing channels with the first said pair being connected to said antenna means to receive signals of said first polarization and the second said pair connected to receive signals of said second polarization, one channel of each said pair being operative to pass signals of said first frequency and the other being operative to pass signals of said second frequency;
   and means for deriving an output signal by additive combination of the several signals as passed by said signal processing channels.

2. A diversity radar system as defined in claim 1 wherein that signal processing channel of each pair which is operative to pass signals of said first frequency includes delay means operative to delay such signals by a period substantially equal to their lengths, to thus provide juxtaposition in time of said first and second pulse parts.

3. A diversity radar system as defined in claim 1 wherein said antenna means comprises:
   a reflector;
   a first feed element arranged to illuminate said reflector and to transmit and receive radiation of said first polarization;
   a polarized mirror interposed between said reflector and said first feed element so as transmit radiation of said first polarization and to reflect radiation of said second polarization incident on said reflector;
   and a second feed element disposed to receive radiation of said second polarization reflected by said polarized mirror;
   thus enabling transmission of radiation of said first polarization and reception of radiation of both said polarizations.

4. A diversity radar system as defined in claim 1 wherein said antenna means comprises:
   a main reflector including reflecting surface means operative to rotate the plane of polarization of incident radiation to the orthogonal;
   a subreflector including polarized mirror means operative to transmit radiation of said first polarization and to reflect radiation of said second polarization;
   a first feed element for transmission and reception of radiation of said first polarization by reflection from said subreflector and said main reflector with rotation of the plane of polarization of radiation transmitted and received by the main reflector;
   and a second feed element for reception of radiation of said second polarization by reflection from said main reflector with rotation of the plane of polarization of the radiation so as to enable its transmission through said subreflector to said second feed element.

5. A diversity radar system as defined in claim 1 including means for blocking reflected signals of one of said polarizations at low angles of elevation of the radar line of sight.

6. A diversity radar system as defined in claim 1 wherein the transmitted signals are of one only of said orthogonally related polarizations and said receiver incorporates means selectively operable to block received signals of said transmitted polarization and to pass only received signals of said orthogonally related polarization.

References Cited
UNITED STATES PATENTS

| | | | |
|---|---|---|---|
| 2,508,571 | 5/1950 | Hudspeth | 343—100.3 |
| 2,991,473 | 7/1961 | Staaden | 343—100.3 |
| 3,263,227 | 7/1966 | Ferry et al. | 343—17.2 |
| 3,268,891 | 8/1966 | Atlas | 343—5 |
| 3,271,771 | 9/1966 | Hannan et al. | 343—779 |

RODNEY D. BENNETT, *Primary Examiner.*

C. L. WHITHAM, *Assistant Examiner.*